(12) United States Patent
Ouwenga

(10) Patent No.: US 10,006,343 B2
(45) Date of Patent: Jun. 26, 2018

(54) BOOST SYSTEM INCLUDING TURBO AND HYBRID DRIVE SUPERCHARGER

(71) Applicant: EATON CORPORATION, Cleveland, OH (US)

(72) Inventor: Daniel R. Ouwenga, Portage, MI (US)

(73) Assignee: Eaton Intelligent Power Limited, Dublin (IE)

( * ) Notice: Subject to any disclaimer, the term of this patent is extended or adjusted under 35 U.S.C. 154(b) by 0 days. days.

(21) Appl. No.: 15/141,214

(22) Filed: Apr. 28, 2016

(65) Prior Publication Data
US 2016/0237880 A1  Aug. 18, 2016

Related U.S. Application Data

(63) Continuation of application No. PCT/US2014/062702, filed on Oct. 28, 2014.
(Continued)

(51) Int. Cl.
| F02B 37/04 | (2006.01) |
| F02B 39/04 | (2006.01) |
| F02B 37/16 | (2006.01) |
| F02B 39/10 | (2006.01) |
| F02B 39/12 | (2006.01) |
| F02B 5/00  | (2006.01) |

(Continued)

(52) U.S. Cl.
CPC ............. *F02B 37/04* (2013.01); *F02B 5/00* (2013.01); *F02B 33/34* (2013.01); *F02B 33/36* (2013.01); *F02B 33/38* (2013.01); *F02B 37/013* (2013.01); *F02B 37/16* (2013.01); *F02B 39/04* (2013.01); *F02B 39/06* (2013.01); *F02B 39/10* (2013.01); *F02B 39/12* (2013.01); *F02M 31/20* (2013.01); *Y02T 10/126* (2013.01); *Y02T 10/144* (2013.01)

(58) Field of Classification Search
CPC ........ F02B 37/04; F02B 37/013; F02B 37/16; F02B 39/10; F02B 39/12; F02B 39/04; F02B 33/38; F02B 33/36; F02B 39/06; F02M 31/20; Y02T 10/144
USPC ........................................................ 60/607
See application file for complete search history.

(56) References Cited

U.S. PATENT DOCUMENTS

| 2,585,968 | A | * | 2/1952 | Schneider | ............. F02B 37/105 60/345 |
| 4,145,888 | A | * | 3/1979 | Roberts ................. | F02B 37/005 60/608 |

(Continued)

FOREIGN PATENT DOCUMENTS

| DE | WO 2004025097 A1 * | 3/2004 | ............ F02B 33/446 |
| EP | 1327753 A1 * | 7/2003 | ............ F01M 13/022 |

(Continued)

OTHER PUBLICATIONS

International Search Report for corresponding International Patent Application No. PCT/US2014/062702 dated Feb. 9, 2015.

(Continued)

*Primary Examiner* — Jason T Newton
(74) *Attorney, Agent, or Firm* — Merchant & Gould P.C.

(57) ABSTRACT

The present disclosure relates to a boost system that provides boost pressure to an air intake manifold of an engine. The boost system includes a turbocharger and a supercharger that cooperate to provide the pressure boost to the air intake manifold. The boost system also includes a hybrid drive system for powering the supercharger.

15 Claims, 5 Drawing Sheets

Related U.S. Application Data

(60) Provisional application No. 61/896,476, filed on Oct. 28, 2013, provisional application No. 61/911,310, filed on Dec. 3, 2013, provisional application No. 61/935,030, filed on Feb. 3, 2014.

(51) Int. Cl.
| | |
|---|---|
| *F02B 37/013* | (2006.01) |
| *F02M 31/20* | (2006.01) |
| *F02B 33/34* | (2006.01) |
| *F02B 33/36* | (2006.01) |
| *F02B 33/38* | (2006.01) |
| *F02B 39/06* | (2006.01) |

(56) References Cited

U.S. PATENT DOCUMENTS

| | | | | |
|---|---|---|---|---|
| 4,519,373 | A * | 5/1985 | Hardy | F02B 33/40 |
| | | | | 123/559.3 |
| 4,730,593 | A * | 3/1988 | Regar | F02B 33/446 |
| | | | | 123/559.3 |
| 4,903,488 | A * | 2/1990 | Shibata | F02B 37/04 |
| | | | | 123/562 |
| 5,012,906 | A * | 5/1991 | Meyer | F16D 43/284 |
| | | | | 192/56.31 |
| 5,133,325 | A * | 7/1992 | Winkelmann | F02B 39/04 |
| | | | | 123/559.3 |
| 5,289,813 | A * | 3/1994 | Adachi | F02B 33/36 |
| | | | | 123/559.3 |
| 5,875,766 | A * | 3/1999 | Ozawa | B60K 17/16 |
| | | | | 123/561 |
| 5,947,854 | A * | 9/1999 | Kopko | F16H 3/72 |
| | | | | 475/153 |
| 6,058,916 | A * | 5/2000 | Ozawa | F02B 33/34 |
| | | | | 123/559.3 |
| 6,079,211 | A * | 6/2000 | Woollenweber | F02B 37/025 |
| | | | | 60/602 |
| 6,343,473 | B1 * | 2/2002 | Kanesaka | F02B 33/34 |
| | | | | 60/609 |
| 7,488,164 | B2 | 2/2009 | Swartzlander | |
| 7,703,283 | B2 * | 4/2010 | Barker | F01P 7/046 |
| | | | | 290/4 C |
| 8,186,159 | B2 | 5/2012 | Martins et al. | |
| 8,196,686 | B2 | 6/2012 | Grieve | |
| 8,413,439 | B2 | 4/2013 | Armiroli | |
| 8,541,914 | B2 | 9/2013 | Knight et al. | |
| 8,701,636 | B2 * | 4/2014 | Jensen | F02B 33/34 |
| | | | | 123/561 |
| 9,157,363 | B2 * | 10/2015 | Wade | F02B 37/04 |
| 2002/0083700 | A1 * | 7/2002 | Ellmer | F01N 3/32 |
| | | | | 60/278 |
| 2003/0089348 | A1 * | 5/2003 | Janson | F02B 33/40 |
| | | | | 123/559.1 |
| 2004/0237949 | A1 * | 12/2004 | Yasui | F02B 39/04 |
| | | | | 123/559.1 |
| 2007/0051349 | A1 * | 3/2007 | Marumoto | F02B 33/34 |
| | | | | 123/565 |
| 2009/0019852 | A1 * | 1/2009 | Inoue | F02B 33/40 |
| | | | | 60/608 |
| 2009/0048745 | A1 * | 2/2009 | Wu | B60K 6/24 |
| | | | | 701/51 |
| 2009/0094978 | A1 * | 4/2009 | Yamagata | F01N 13/107 |
| | | | | 60/602 |
| 2009/0291803 | A1 * | 11/2009 | Moeller | B60K 6/365 |
| | | | | 477/110 |
| 2010/0050998 | A1 * | 3/2010 | Ai | F02B 33/40 |
| | | | | 123/565 |
| 2010/0155157 | A1 * | 6/2010 | Grieve | B60K 6/12 |
| | | | | 180/65.6 |
| 2010/0263375 | A1 * | 10/2010 | Grieve | F02B 29/0412 |
| | | | | 60/612 |
| 2010/0275890 | A1 * | 11/2010 | McDonald-Walker | B60K 6/24 |
| | | | | 123/564 |
| 2011/0225806 | A1 | 9/2011 | Knight et al. | |
| 2012/0090319 | A1 * | 4/2012 | Mond | F02B 37/04 |
| | | | | 60/609 |
| 2012/0137681 | A1 * | 6/2012 | Hoess | B60K 6/48 |
| | | | | 60/607 |
| 2013/0207490 | A1 | 8/2013 | Spearman et al. | |
| 2013/0278089 | A1 | 10/2013 | Knight et al. | |
| 2015/0047617 | A1 * | 2/2015 | Benjey | B60K 6/485 |
| | | | | 123/559.3 |
| 2015/0066272 | A1 | 3/2015 | Benjey et al. | |
| 2015/0240826 | A1 * | 8/2015 | Leroy | F04D 27/009 |
| | | | | 415/1 |
| 2015/0330295 | A1 * | 11/2015 | Walls | F02B 67/06 |
| | | | | 475/5 |
| 2015/0377158 | A1 * | 12/2015 | Benjey | F02B 39/10 |
| | | | | 701/22 |
| 2016/0001649 | A1 * | 1/2016 | Benjey | B60K 6/48 |
| | | | | 477/5 |
| 2016/0319733 | A1 * | 11/2016 | Benjey | F02N 11/003 |

FOREIGN PATENT DOCUMENTS

| | | | | |
|---|---|---|---|---|
| EP | 1 888 893 B1 | | 2/2008 | |
| FR | 2 923 421 A1 | | 5/2009 | |
| JP | 07269365 A | * | 10/1995 | |
| JP | 2000230427 A | * | 8/2000 | |
| JP | 2002242687 A | * | 8/2002 | |
| JP | 2004360487 A | * | 12/2004 | |
| JP | 3718386 B2 | * | 11/2005 | ............ F02B 37/04 |
| WO | WO 2011/036538 A1 | | 3/2011 | |
| WO | WO 2011/051789 A1 | | 5/2011 | |
| WO | WO 2013049435 A1 | * | 4/2013 | ............ B60K 6/485 |
| WO | WO 2013/148205 A1 | | 10/2013 | |
| WO | WO 2013/148206 A2 | | 10/2013 | |
| WO | WO 2014/164830 A1 | | 10/2014 | |
| WO | WO 2014/165233 A1 | | 10/2014 | |

OTHER PUBLICATIONS

Extended European Search Report for Application No. 14858365.1 dated Jul. 10, 2017.

* cited by examiner

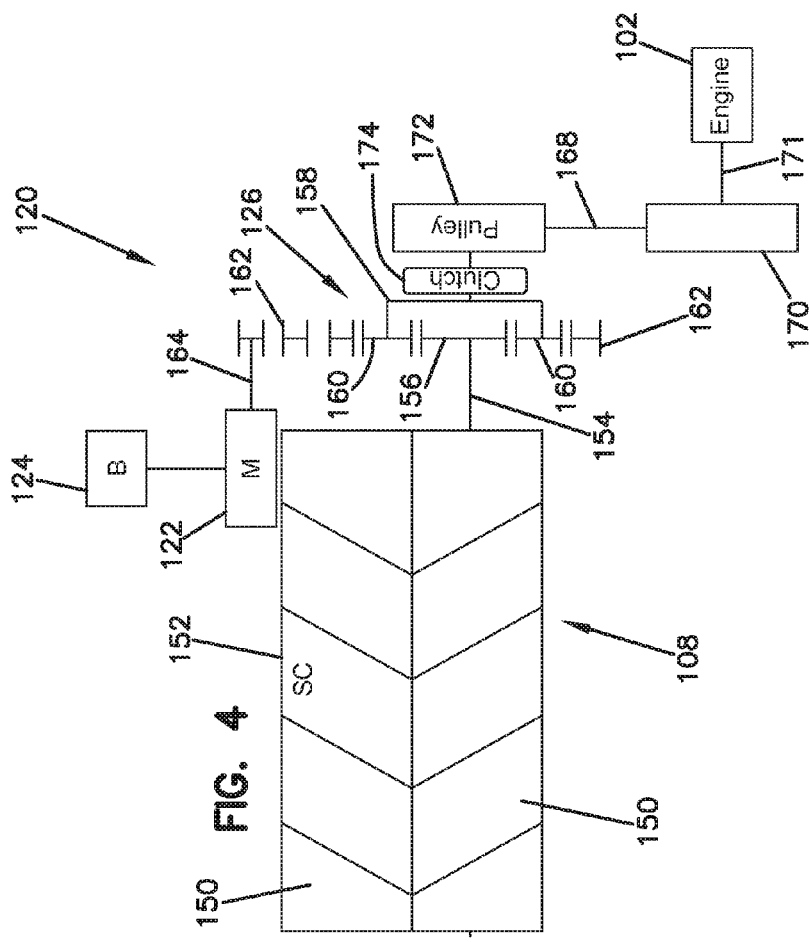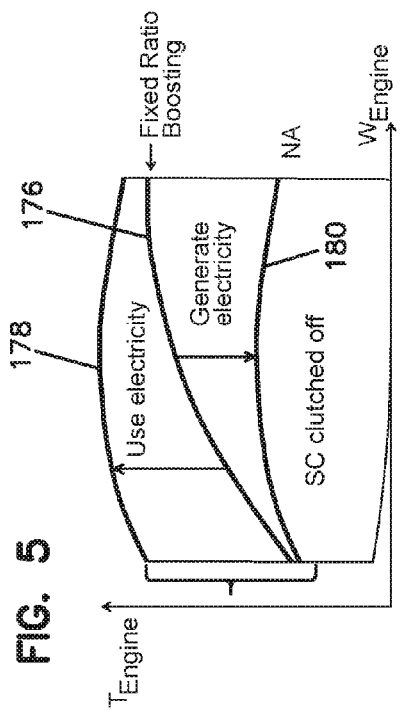

BOOST SYSTEM INCLUDING TURBO AND HYBRID DRIVE SUPERCHARGER

RELATED APPLICATIONS

This application is a Continuation of PCT/US2014/062702, filed on Oct. 28, 2014, which claims benefit of U.S. patent application Ser. No. 61/896,476 filed on Oct. 28, 2013, U.S. patent application Ser. No. 61/911,310 filed on Dec. 3, 2013, and U.S. patent application Ser. No. 61/935,030 filed on Feb. 3, 2014, and which applications are incorporated herein by reference. To the extent appropriate, a claim of priority is made to each of the above disclosed applications.

TECHNICAL FIELD

The present disclosure relates generally to systems for boosting engine intake air pressure to increase the torque available from the engine.

BACKGROUND

Energy efficient engines of reduced size are desirable for fuel economy and cost reduction. Smaller engines provide less torque than larger engines. To increase the torque capacity available from smaller engines, boosting systems have been developed for boosting the air pressure at the engine intake to increase the torque available from the engine. Conventional boosting systems can include superchargers and/or turbochargers. A turbocharger typically includes a first turbine exposed to engine exhaust flow and a second turbine positioned in the air intake of the engine. Exhaust flow from the engine turns the first turbine which transfers torque to the second turbine causing the second turbine to boost the intake air pressure. Turbochargers can be efficient but have the disadvantage of lag. Lag relates to a delay in providing boost pressure. Because the turbocharger depends on energy from the exhaust to provide the boost pressure, when the engine is operating at slow speeds, high levels of boost cannot be immediately provided when needed by the engine. Instead, full levels of boost are not provided until the engine reaches a high enough speed where the exhaust has sufficient energy to adequately drive the turbocharger. In contrast to turbochargers, superchargers are driven by torque drawn directly from the engine. This is advantageous because superchargers can provide a rapid boost in pressure without the type of delays associated with turbochargers. However, superchargers are typically designed with a fixed gear ratio that under normal driving conditions generates excess air flow that is typically routed through a bypass and recirculated through the supercharger. This results in energy loss. To overcome the above issues, boost systems have been developed that include both turbochargers and superchargers. In this type of boost system, the turbocharger can be designed taking efficiency primarily into consideration, and the supercharger can be designed to supplement the turbocharger to compensate for turbocharger lag.

SUMMARY

The present disclosure relates to an engine boosting system that uses a turbocharger and a hybrid drive supercharger. The use of a turbocharger and supercharger in series can allow for the reduction in power plant size (e.g. a 3 liter engine can be used instead of a 4 liter engine). In such configurations, increased fuel economy (when compared on the basis of engine torque) at low and part engine loads associated with low vehicle speeds and gentle accelerations can result.

In certain examples, the turbocharger can be designed primarily to enhance efficiency, and the supercharger can be designed to address lag issues associated with the turbocharger. The hybrid drive associated with the supercharger can be configured to enhance the efficiency of the supercharger by controlling the speed of the supercharger to reduce or minimize the excess flow generated by the supercharger. In certain examples, the hybrid drive can include a gearing arrangement such as a planetary gear set that controls the transfer of torque between the engine crankshaft, an electric motor and the rotors of the supercharger. In certain examples, the supercharger is a Roots-style turbocharger having a fixed displacement per each rotation of the rotors.

In certain examples, the hybrid drive is configured to use a limited amount of electrical energy in an effective and efficient manner. In certain examples, the hybrid drive can be configured to transfer torque from the engine to the supercharger at a gear ratio (e.g., a fixed gear ratio) that provides less torque than the turbocharger needs to satisfy worst-case transient conditions. In this type of arrangement, when the system encounters a situation where the boost pressure needed by the system exceeds that the boost pressure that can be provided solely from the engine through the fixed gear ratio, supplemental torque can be provided by the electric motor to meet the boost pressure needs. In contrast, when the boost pressure needed by the system is less than the boost pressure that is provided by the engine through the fixed gear ratio, the electric motor can be controlled to slow the rotation of the turbocharger thereby drawing energy from the turbocharger that can be used for recharging the battery. In this way, the speed of the supercharger rotors can be varied to control bypass losses.

By using a hybrid mechanical and electrical system, the amount of electrical energy needed by the system can easily be met by standard automobile electrical systems. In certain examples, the electrical motor can have a capacity of two kilowatts or less and the system is compatible with a 12 volt automobile electrical system. Of course, depending on the application, larger electrical motors and systems requiring higher voltages (e.g., 48 volts) can also be used.

In still further examples of the present disclosure, a clutch can be provided and the electric motor can be used to reduce clutch differential speed before engagement.

A variety of additional aspects will be set forth in the description that follows. The aspects can relate to individual features and to combinations of features. It is to be understood that both the forgoing general description and the following detailed description are exemplary and explanatory only and are not restrictive of the broad inventive concepts upon which the examples disclosed herein are based.

BRIEF DESCRIPTION OF THE DRAWINGS

FIG. 4 schematically depicts a hybrid drive in accordance with the principles of the present disclosure for powering a supercharger;

FIG. 5 is a graph illustrating operational parameters of the hybrid drive arrangement of FIG. 4.

DETAILED DESCRIPTION

Aspects of the present disclosure can relate to a boost system that uses both a supercharger and a turbocharger to provide boost pressure to an engine. In certain examples, the engine can include a spark ignition gasoline engine. In certain examples, the gasoline engine can have a size ranging from one liter to four liters. In another example, the engine can have a size ranging from one liter to three liters. Of course, in other examples, aspects of the present disclosure are also applicable to engines having sizes outside the ranges specified above.

Figure 1:
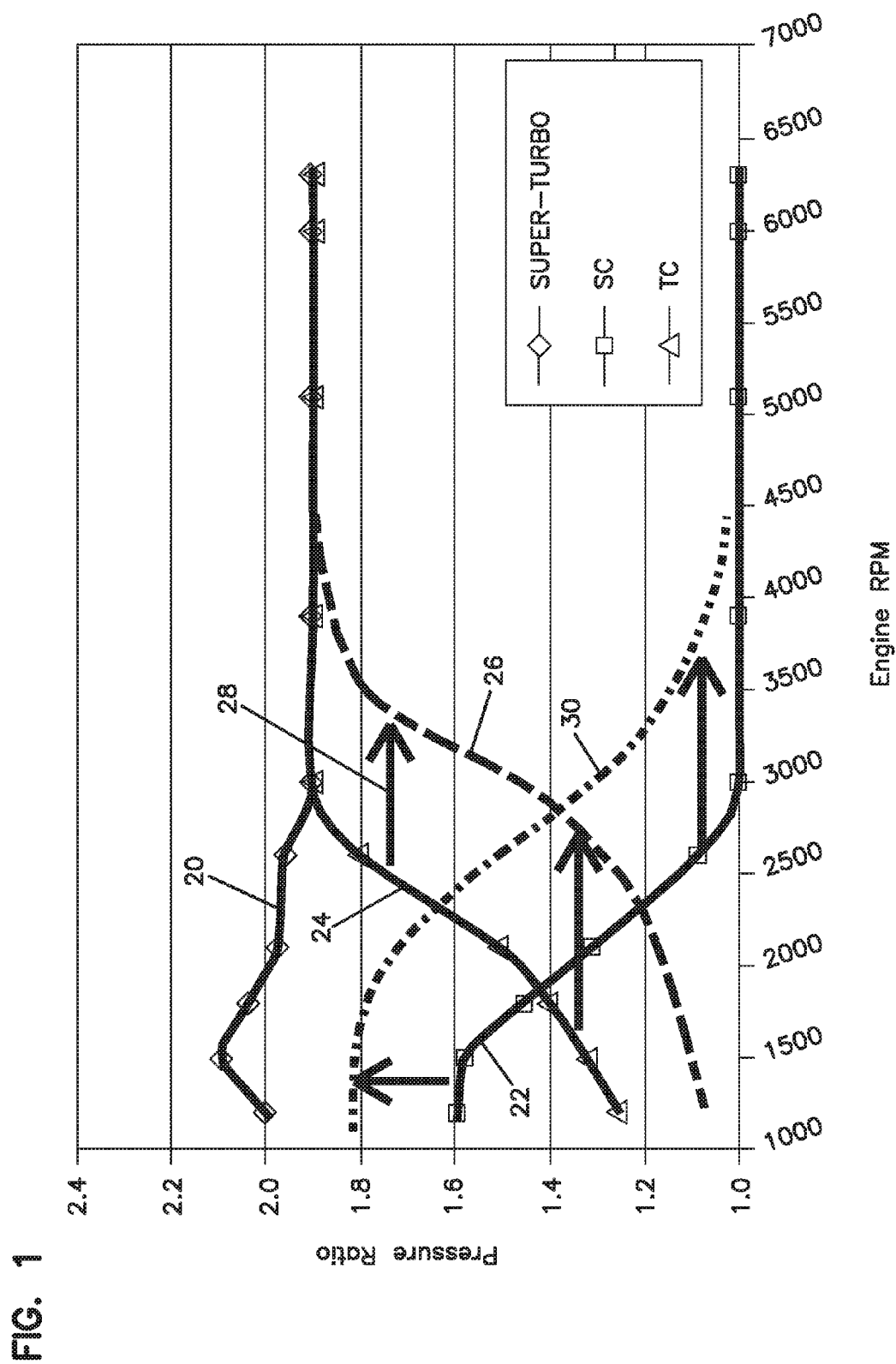
FIG. 1 is a graph showing a pressure ratio balance between a supercharger and a turbocharger in a combined supercharger, turbocharger boost system.

In a boost system including both a supercharger and a turbocharger, the system can be designed with a pressure ratio balance between the supercharger and the turbocharger selected to achieve a desired manifold pressure profile. FIG. 1 shows an example pressure ratio balance strategy/profile for a system including both a supercharger and a turbocharger. The pressure ratio values are plotted versus engine speed to generate profiles. The graph includes a desired manifold pressure profile 20. The graph also includes a pressure ratio profile 22 for a first supercharger and a pressure ratio profile 24 for a first turbocharger. The combined pressure ratio values provided by the pressure ratio profile 22 and the pressure ratio profile 24 correspond to the manifold pressure profile 20. In this particular example, the first turbocharger has a relatively small lag and the first supercharger is designed to compensate for this relatively small lag. The graph of FIG. 1 also shows a pressure ratio profile 26 corresponding to a second turbocharger. The second turbocharger is larger than the first turbocharger and can provide higher efficiencies at higher engine speeds. However, the second supercharger has a significantly larger lag (see arrow 28) as compared to the first supercharger. To reduce the effective lag 28 and to allow the use of the higher efficiency second turbocharger, the second turbocharger is matched with a second supercharger configuration that generates a pressure ratio profile 30 that is shifted to the right as compared to the pressure ratio profile 22 so as to account for the lag 28. It will be appreciated that the enhanced boost pressure provided by the second supercharger configuration can be provided by adjusting a fixed gear ratio provided between the supercharger and a torque output (e.g., a crankshaft) of the engine.

Figure 2:
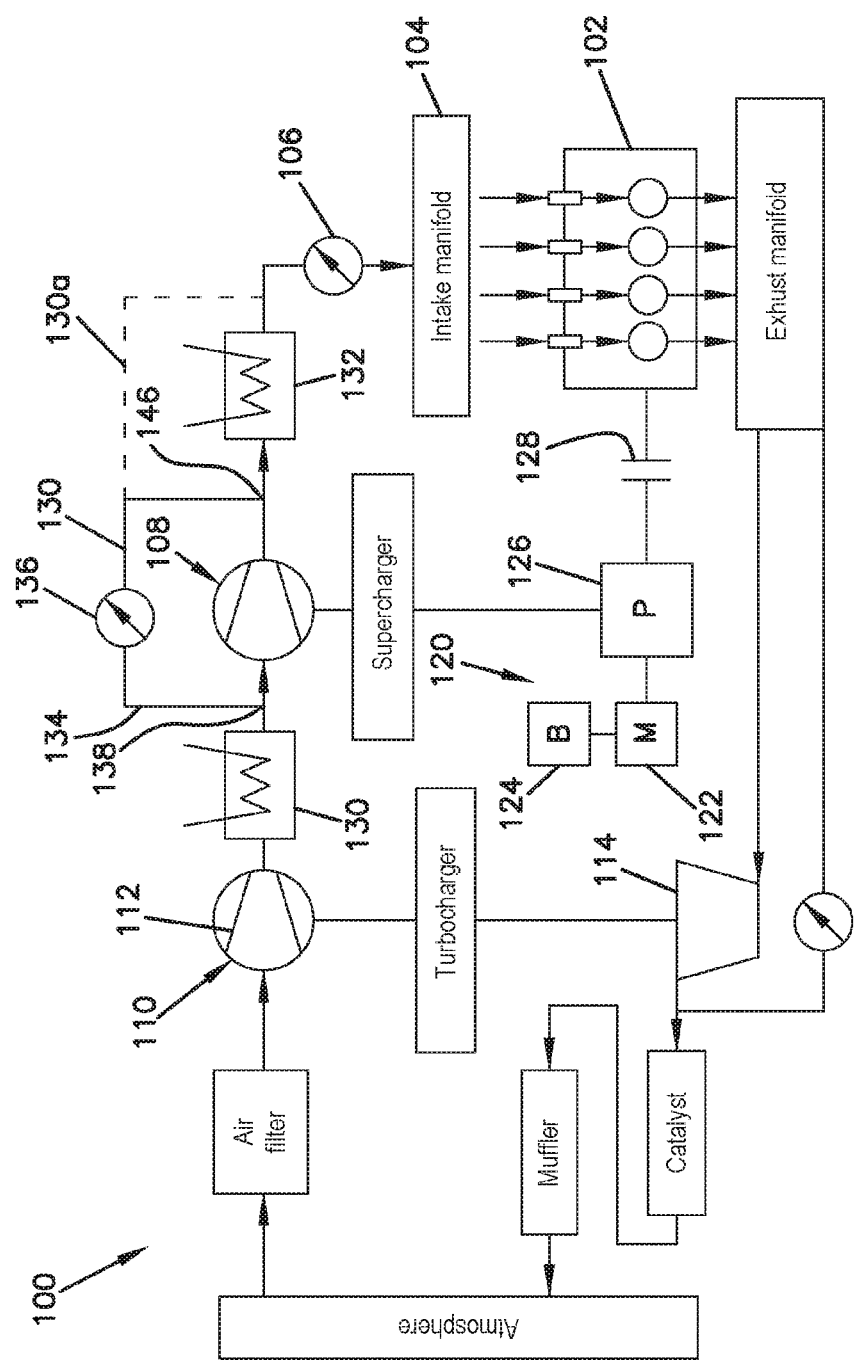
FIG. 2 is a system layout showing an example combined turbocharger and supercharger boost system in accordance with the principles of the present disclosure.

FIG. 2 illustrates an example boosting system 100 in accordance with the principles of the present disclosure. The boosting system 100 is configured to increase the boost pressure provided to an engine 102. In certain examples, the engine 102 can include a gasoline engine having an intake manifold 104 and a throttle 106. The boosting system 100 is also depicted including a supercharger 108 and a turbocharger 110. The supercharger 108 and the turbocharger 110 are positioned along an air intake of the engine 102 with the supercharger 108 being positioned downstream from the turbocharger 110. The turbocharger 110 includes at least one rotor 112 for boosting air pressure at the engine intake and a turbine 114 exposed to engine exhaust for extracting energy from the engine exhaust to power the rotor 112. In certain examples, the turbocharger 110 can include a single scroll turbocharger. The supercharger 108 is powered by a hybrid drive system 120. The hybrid drive system 120 is configured to use torque mechanically transferred from the engine 102 (e.g., from the engine crankshaft) to drive the supercharger 108, and is also configured to use torque generated from an electric motor/generator 122 to provide torque to the supercharger 108. The electric motor/generator 122 can be powered by a battery 124 when functioning as an electric motor, and can be used to charge the battery 124 when functioning as a generator 122. In certain examples, the electric motor/generator 122 can include an internal stop mechanism or a brake for braking the electric motor/generator 122 when it is desired to stop rotation of the output/input shaft of the electric motor/generator. In certain examples, the electric motor/generator 122 can interface with an electronic controller that controls operation of the brake and also controls operation of the electric motor/generator 122 in both the generating state and in the motoring state. The hybrid drive system 120 can further include a gear set such as a planetary gear set 126 that allows torque to be transferred between the supercharger 108, the electric motor/generator 122 and the crankshaft of the engine 102. In certain examples, a clutch 128 can be provided for selectively coupling the planetary gear set to the engine and for decoupling the planetary gear set from the engine.

Referring still to FIG. 2, the boosting system 100 can include intercoolers 130, 132 for cooling the intake air provided to the intake manifold 104. The intercooler 130 is positioned between the turbocharger 110 and the supercharger 106 and the intercooler 132 is provided between the supercharger 108 and the engine 102. The boosting system 100 also includes a bypass line 134 that bypasses the supercharger 108. Flow through the bypass line 134 is controlled by a valve 136 that can open flow, close flow or proportion flow. As depicted, the bypass line 134 has an upstream end 138 positioned between the intercooler 130 and the supercharger 108 and a downstream end 140 positioned between the supercharger 108 and the intercooler 132. In an alternative example, the downstream end of the bypass line 134 can be positioned downstream of the intercooler 132 as shown by dash line 130a. In such an example, the bypass line 134 would bypass the supercharger 108 and the intercooler 132.

In the depicted example, the throttle 106 is positioned between the supercharger 108 and the engine 102 such that the throttle 106 is positioned downstream from the supercharger 108. In other examples, the throttle can be positioned upstream from the supercharger 108.

Figure 3:
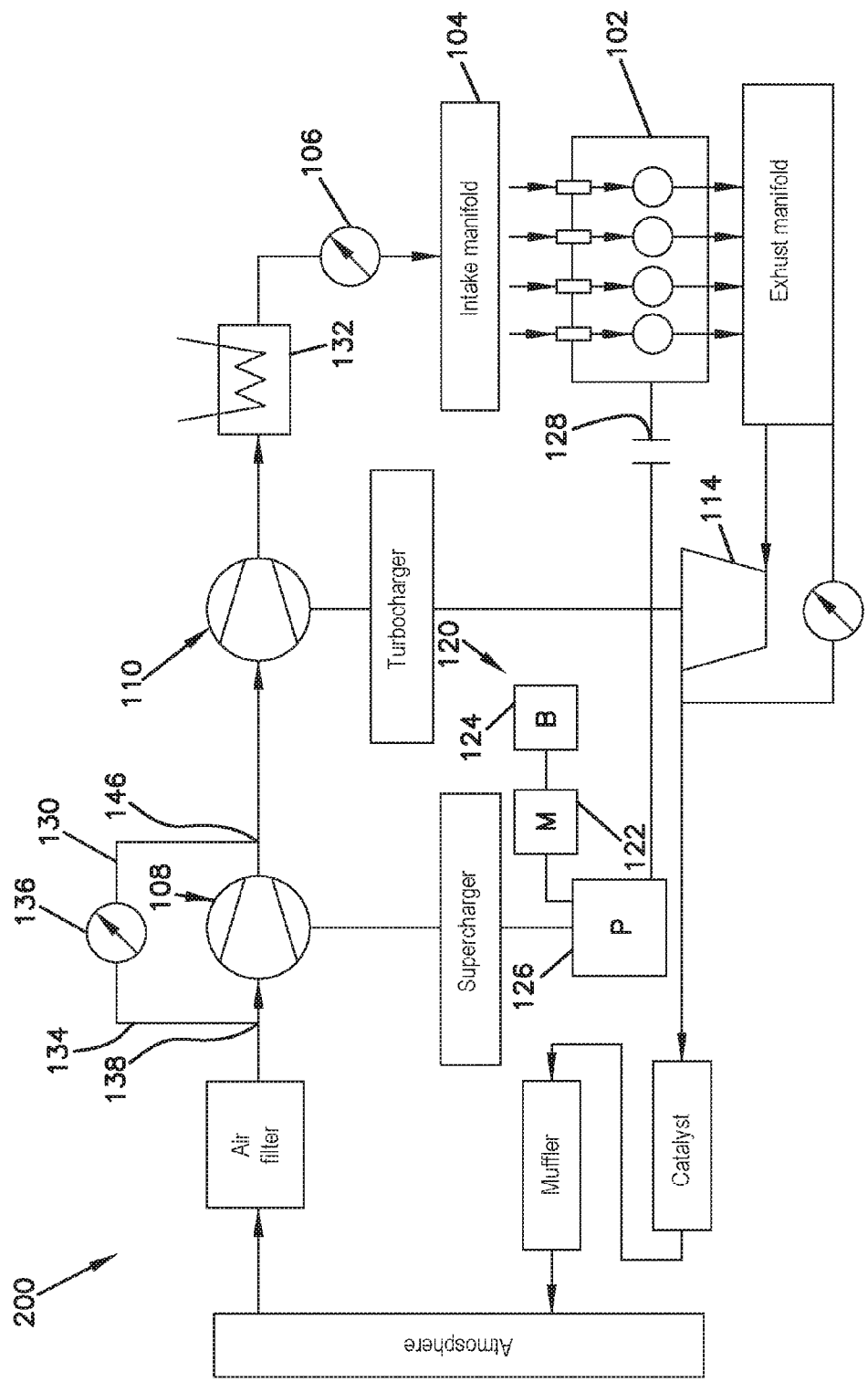
FIG. 3 is a system layout for another example combined supercharger and turbocharger boost system.

FIG. 3 illustrates another boosting system 200 in accordance with the principles of the present disclosure. The boosting system 200 includes the same basic components as the boosting system 100. However, the boosting system 200 is configured with the turbocharger 110 positioned downstream from the supercharger 108.

In certain examples, the hybrid drive system 120 can be configured to provide various functions and can be operated in various modes. In certain examples, the hybrid drive system 120 can be provided with a brake for applying a braking force to the rotors of the supercharger 108 such that the rotors of the supercharger 108 are prevented from rotating. In such an example, with the supercharger brake open, the electric motor/generator 122 can be operated to vary the speed of the supercharger 108 to control and vary the boost rate based on the operating condition of the engine. This mode can be referred to as a variable speed boost mode. In an engine start/stop mode, the supercharger brake can be locked and the electric motor 122 can provide torque to the engine for starting. With the supercharger brake locked, the system can be operated in a brake regeneration mode in which the electric motor/generator 122 is operated as a generator and is used to recover energy associated with braking. With the supercharger brake locked, the boosting system can be operated in a torque assist mode in which the electric motor 122 is operated as a motor and is used to provide supplemental torque to the engine. With the supercharger brake locked, the hybrid drive system 120 can also be operated in an alternator mode in which the electric motor/generator functions as a generator and uses torque from the engine to charge the battery. It will be appreciated that further details relating to example hybrid drive systems that can be incorporated into the present boosting system are disclosed in U.S. Provisional Patent Application Ser. No. 61/776,834; U.S. Provisional Patent Application Ser. No. 61/776,837; and PCT Application No. PCT/US2013/003094, all of which are hereby incorporated by reference in their entireties.

FIG. 4 illustrates an example configuration for the hybrid drive system 120. The hybrid drive system 120 includes the supercharger 108. The supercharger 108 includes intermeshed rotors 150 positioned within a supercharger housing 152. Timing gears can be provided for transferring torque between the rotors 150 and for ensuring that the rotors 150 rotate at the same speed. An input shaft 154 can supply torque to one of the rotors 150. In certain examples, the supercharger 108 can be a Roots-style supercharger that has a fixed air displacement for each rotation of the rotors 150. An example supercharger is disclosed at U.S. Pat. No. 7,488,164 that is hereby incorporated by reference in its entirety.

Still referring to FIG. 4, the planetary gear set 126 includes a sun gear 156 that is coupled to and rotates in unison with the input shaft 154, a carrier 158 that carries planetary gears 160 that surround an intermesh mesh with the sun gear 146, and a ring gear 162 that surrounds and intermeshes with the planetary gears 160. The electric motor/generator 122 is shown including an input/output shaft 164 that is coupled to the exterior of the ring gear 162 by one or more gears 166. The hybrid drive system 120 also includes a belt 168 that transfers torque from a pulley 170 attached to the crankshaft 171 of the engine 102 to a pulley 172 coaxially aligned with the axis of rotation of the sun gear 156 and carrier 158. A clutch 174 is positioned between the carrier 158 and the pulley 172. When the clutch 174 is operated in an engaged state (i.e., a torque transmitting state), torque is transferred between the pulley 172 and the carrier 158 such that the pulley 172 and the carrier 158 rotate in unison with one another about the axis of rotation of the carrier 158. In contrast, when the clutch 174 is operated in a non-engaged state (i.e., non-torque-transferring state), torque is not transferred between the pulley 172 and the carrier 158 and each can rotate independent of the other. In the example of FIG. 4, a separate supercharger brake is not provided for applying a braking force directly to at least one of the rotors of the supercharger 108.

FIG. 5 is a torque map for the hybrid drive system 120 of FIG. 4. The torque map shows the engine torque at different engine speeds. When rotation of the shaft of the electric motor/generator 122 is stopped while the clutch 174 is engaged, the ring gear 162 stops rotating and torque is transferred from the engine crankshaft to the supercharger 108 at a fixed boost gear ratio defined by the relationship between the sun gear 156 and the planetary gears 160. As shown at FIG. 5, line 176 shows the boost profile provided by mechanical torque taken from the engine at the fixed boost gear ratio. As shown at FIG. 5, the line 176 is positioned between a line 178 and a line 180. The line 178 is representative of the boost profile needed to be provided by the supercharger 108 to meet a worse-case boosting scenario (e.g., a worse case transient condition) and the line 178 is representative of the supercharger not providing any boost (e.g., when the clutch 174 is disengaged). It will be appreciated that the electric motor/generator 122 can be used to vary the speed of the supercharger 108 from the baseline profile set by line 176. In one example, an electronic controller interfaces with the electric motor/generator 122 to control operation of the electric motor/generator 122 such that the boost provided by the supercharger 108 varies to match a given operating condition of the engine. For example, if additional boost above the baseline value 176 is needed, the electric motor/generator 122 can be operated as a motor and can draw electricity from the battery 124 to rotationally drive the ring gear 162 so as to increase the rotational speed of the rotors of the supercharger 108 to a desired level. In contrast, if the required boost from the supercharger 108 is less than the boost provided by the baseline boost profile 176, the electric motor/generator 122 can be operated as a generator and can be back-driven by the ring gear 162 thereby causing the rotors of the supercharger 108 to slow down. It will be appreciated that the torque provided by the electric motor/generator 122 when operating in the motoring state and the resistance provided by the electric motor/generator 122 when operating in the generator state can be controlled by the control system to provide the exact level of supercharger boost above or below the baseline value 176 needed to satisfy the requirements of the engine under a given operating condition. By slowing down the rotors of the supercharger 108 with the electric rotors/generator 122, excess flow generated by the supercharger 108 is reduced so as to reduce bypass losses and energy can be recaptured by recharging the battery 124.

Figure 6:
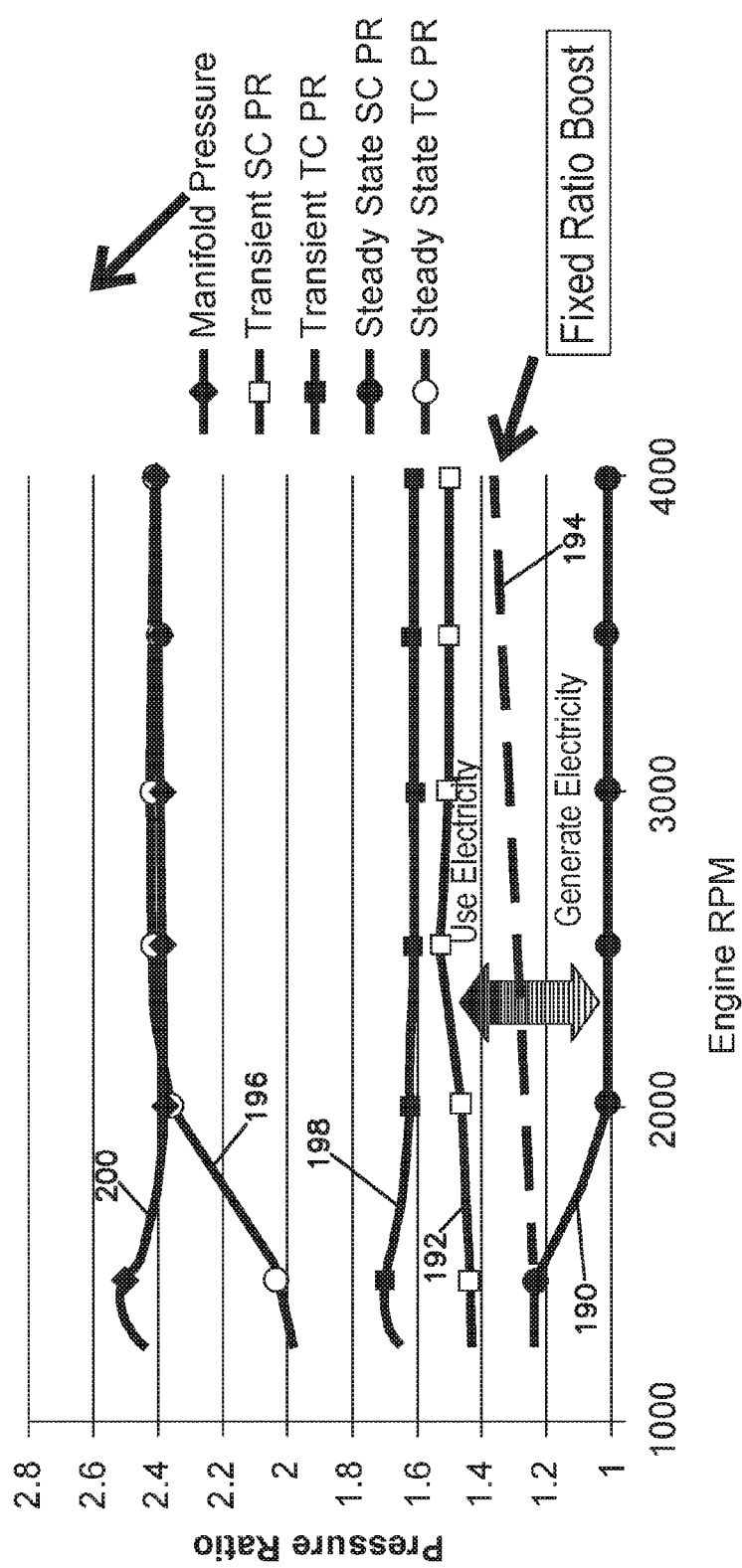
FIG. 6 illustrates example operating parameters for the hybrid supercharger drive of FIG. 4 for both transient and steady state operating conditions.

It will be appreciated that the boosting system 100 can be designed taking into consideration both steady state and transient operating conditions. In certain examples, the system is designed to be efficient at steady state operating conditions and the fixed ratio boost provided by the supercharge 108 (as defined by line 176) has been selected so as to ensure efficient operation at a steady state. Referring to FIG. 6, line 190 shows the boost pressure ratio profile provided by the supercharger 108 at steady state conditions and line 192 shows the boost pressure ratio provided by a worse case transient condition. The baseline boost pressure ratio profile defined by line 194 represents the boost pressure ratio profile provided to satisfy the supercharger 108 when powered solely by torque from the engine through the fixed boost ratio gearing of the planetary gear set 126. To enhance the efficiency at steady state, it is desirable for the baseline value profile 194 to be substantially below the transient pressure ratio profile defined by line 192. FIG. 6 also shows the boost pressure ratio profile provided by the turbocharger at steady state conditions (see line 196) and the boost pressure ratio provided by the turbocharger at transient conditions (see line 198). FIG. 6 further shows the desired intake manifold pressure ratio profile provided at the intake manifold of the engine. This pressure ratio profile is depicted by line 200. It will be appreciated that under steady state conditions, the supercharger 108 and the turbocharger 110 provide the boosting levels responding to lines 190 and 196 to provide the desired pressure ratio according to line 200. Normally, under transient operating conditions, the supercharger 108 and the turbocharger 110 operate according to lines 192 and 198 so as to cooperate to satisfy the manifold pressure requirements established by line 200.

It will be appreciated that the supercharger 108 can be configured to withstand high flow/high pressure conditions. In certain examples, the supercharger 108 can include enhanced shaft sealing of the type disclosed at U.S. Provisional Patent Application Ser. Nos. 61/776,568 and 61/776,993, which are hereby incorporated by reference in their entireties.

In certain examples in accordance with the principles of the present disclosure, the boost system 100 can include control features to enhance clutch performance and reduce clutch wear. In certain examples, the electric motor/generator 122 can be used to reduce clutch differential speed before engagement. For example, under normal extended steady state conditions, the clutch 174 can be operated in the disengaged state where torque is not transferred from the pulley 172 to the carrier 158. In this condition, the bypass line 134 can be opened to allow the intake air to bypass the supercharger 108. In this condition, the rotors of the supercharger 108 do not rotate and the carrier 158 also does not rotate. Alternatively, the rotors of the supercharger 108 and the carrier 158 may rotate at a speed substantially slower than the pulley 172. To limit clutch wear, prior to engaging the clutch 174, the electric motor/generator 122 can be used to reduce the clutch differential speed. For example, the electric motor/generator 122 can draw electricity from the battery 124 and convert this energy to a torque that is supplied to the ring gear 162 for rotating the ring gear 162. Rotation of the ring gear causes rotation of the carrier 158 since the inertial mass of the supercharger rotors prevents the sun gear 156 from rotating. Sensors can be utilized to monitor the rotational speed of the portion of the clutch corresponding to the carrier 158 and the portion of the clutch corresponding to the pulley 172. When the differential speed between the components of the clutch is sufficiently low or zero, the clutch 174 is then engaged. Upon engagement of the clutch 174, the electric motor/generator 122 is operated as a generator thereby providing resistance causing torque to be transferred through the planetary gear set 126 to the rotors of the supercharger 108. By controlling the resistance provided by the electric motor/generator 122 while the electric motor/generator 122 operates in the generator mode, the electric motor/generator 122 can control the supercharger engagement profile.

The hybrid drive system 120 can further include additional operational modes. For example, in low battery conditions, the control system can be configured to operate the hybrid drive system 120 only in fixed ratio or regeneration modes. In other words, once the battery level falls below a predetermined level, the control system can prevent the electric motor/generator 122 from operating as a motor and applying additional torque to the ring gear 162. Thus, under this type of condition, the maximum boost provided by the supercharger 108 is established by the baseline value corresponding to the fixed ratio boost.

In still other examples, it may be desirable to provide significant levels of boost without drawing torque from the engine 102. To accommodate such situations, the hybrid drive system 120 can be provided with an optional electric-only boost mode. To access the electric-only boost mode, the clutch 174 is disengaged and a brake or lock is used to prevent rotation of the carrier 158. The electric motor/generator 122 is then operated as a motor so as to apply torque through the planetary gear set 126 for driving rotation of the rotors of the supercharge 108.

As described above, in certain examples, the electric motor/generator 122 can include an internal stop mechanism or a brake for braking the electric motor/generator 122 when it is desired to stop rotation of the output/input shaft of the electric motor/generator. In other examples, an external brake applied to the ring gear, the motor shaft or any intermediate components can be used to provide selective braking of the motor. In certain examples, the motor is braked when it is desired to drive the supercharger only from the engine (e.g., under low battery power conditions). Thus, supercharger boost is available even under low battery power conditions. In certain examples, torque is transferred to the motor and the supercharger from the engine crankshaft to provide power for driving the supercharger while simultaneously driving the motor/generator to re-charge/re-generate the battery under low battery power conditions.

Another aspect of the present disclosure relates to a boost system for providing boost pressure to an air intake manifold of an engine. The boost system includes a turbocharger and a supercharger that cooperate to provide the pressure boost to the air intake manifold. The boost system also includes a hybrid drive system for powering the supercharger. In certain examples, the hybrid drive system includes a mechanical connection for transferring torque between the supercharger and the engine (e.g., between the engine crankshaft and a drive shaft of the supercharger) and a mechanical connection for transferring torque between a supplemental power source (e.g., an electric motor and/or an electric motor/generator) and the drive shaft of the supercharger. In certain examples, the hybrid drive can include a planetary gear set for transferring torque between the engine crankshaft and the drive shaft of the supercharger and between the supplemental power source and the drive shaft of the supercharger. In certain examples, a ring gear of the planetary gear set is coupled to the supplemental power source, a sun gear of the planetary gear set is coupled to the supercharger shaft and a carrier of the planetary gear set can be coupled to the engine crankshaft. Couplings can be made with gear sets, belts or other means.

In certain examples, hybrid drive systems include mechanical connections for transferring torque between a drive shaft of a supercharger and an engine (e.g., between the engine crankshaft and a drive shaft of the supercharger) and a mechanical connection for transferring torque between a supplemental power source (e.g., an electric motor and/or an electric motor/generator) and the drive shaft of the supercharger. In certain examples, the hybrid drive system transfers (e.g., proportions) torque between the engine, the supercharger and the supplemental power source.

From the forgoing detailed description, it will be evident that modifications and variations can be made in the aspects of the disclosure without departing from the spirit or scope of the aspects.

What is claimed is:

1. A boost system for providing boost pressure to air within an air intake manifold of an engine, the boost system comprising:
   a turbocharger and a supercharger that cooperate to provide a total pressure boost to the air intake manifold; and
   a hybrid drive system including an electric motor/generator coupled to a battery and including a planetary gear set that provides a torque transfer interface between the electric motor/generator, the supercharger, and the engine and including a clutch provided between the planetary gear set and the engine for selectively engaging and disengaging the planetary gear set from the engine;

wherein the hybrid drive system is operable in:

a turbocharging only mode, wherein the clutch is disengaged such that the supercharger provides no pressure boost such that the turbocharger provides the entirety of the total pressure boost;

a steady state mode, wherein the clutch is engaged and the supercharger is driven only by the engine through the planetary gear set such that a baseline portion of the total pressure boost to the air intake manifold is provided at a fixed ratio with the engine speed;

a first transient mode, wherein the clutch is engaged and the electric motor/generator is operated as a generator such that the supercharger provides a portion of the total pressure boost that is less than the baseline portion;

a second transient mode, wherein when the clutch is engaged and the electric motor/generator is operated as a motor such that the supercharger provides a portion of the total pressure boost that is greater than the baseline portion.

2. The boost system of claim 1, wherein the turbocharger is positioned upstream from the supercharger.

3. The boost system of claim 1, wherein the turbo charger is positioned downstream from the supercharger.

4. The boost system of claim 1, wherein the turbocharger is a single scroll turbine.

5. The boost system of claim 4, wherein the engine has a size in the range of 1-4 liters.

6. The boost system of claim 4, wherein the engine has a size in the range of 1-3 liters.

7. The boost system of claim 1, wherein the engine is a spark ignition gasoline engine.

8. The boost system of claim 1, further comprising a bypass line that bypasses the supercharger.

9. The boost system of claim 8, further comprising an intercooler positioned downstream from the supercharger for cooling the intake air, wherein the bypass line bypasses both the supercharger and the intercooler.

10. The boost system of claim 1, wherein the electric motor/generator is used to reduce differential rotational speed within the clutch prior to engaging the clutch.

11. The boost system of claim 10, wherein the planetary gear set includes a sun gear coupled to a rotor of the supercharger, a carrier coupled to one side of the clutch, a ring gear coupled to the electric motor/generator, planetary gears intermeshed between the sun gear and the ring gear, and a belt for transferring torque from the engine to a pulley, and wherein the clutch transfers torque between the pulley and the carrier when engaged and does not transfer torque between the pulley and the carrier when not engaged.

12. The boost system of claim 11, wherein the boost system can be operated in an electric only mode by locking the carrier, disengaging the clutch and operating the motor/generator as a motor so as to apply torque to the ring gear.

13. The boost system of claim 11, wherein the boost system can be operated in a low battery mode in which the motor/generator is braked and the supercharger is driven only by the engine.

14. The boost system of claim 11, the boost system can be operated in a low battery mode in which the motor/generator is prevented from acting as a motor.

15. The boost system of claim 11, the boost system can be operated in a low battery mode in which the motor/generator is operated as a generator and the supercharger is driven only by the engine.

* * * * *